METHODS OF FORMING AND APPLYING MIXTURES
Original Filed Jan. 29, 1963 2 Sheets-Sheet 1
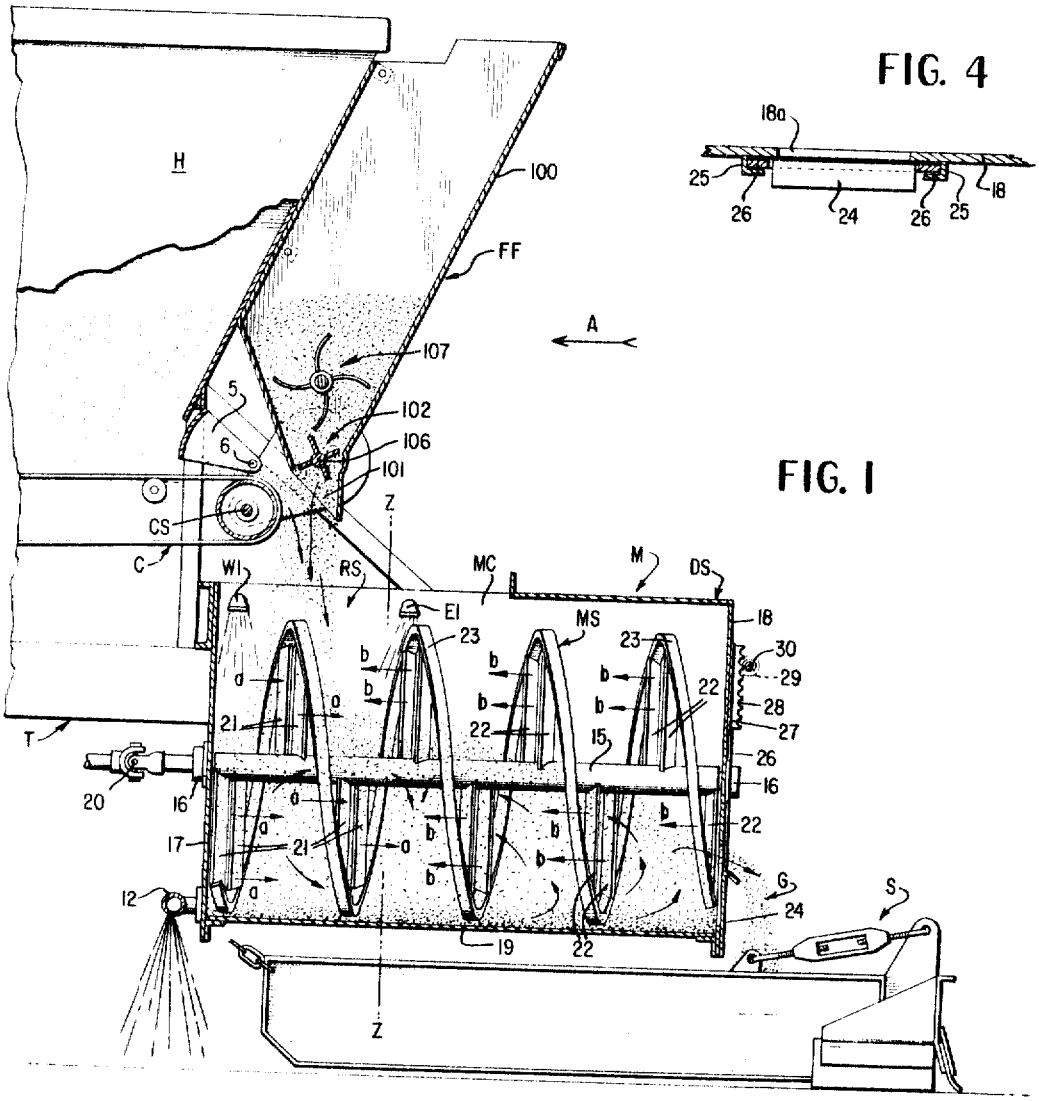
FIG. 1
FIG. 4
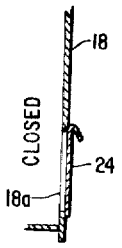
FIG. 3a
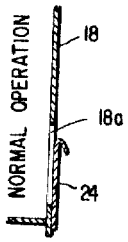
FIG. 3b
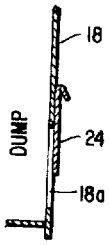
FIG. 3c
INVENTOR.
BERNARD W. YOUNG
BY Baldwin & Wright
ATTORNEYS.

METHODS OF FORMING AND APPLYING MIXTURES

Original Filed Jan. 29, 1963 2 Sheets-Sheet 2

INVENTOR.
BERNARD W. YOUNG

BY Baldwin & Wight

ATTORNEYS.

United States Patent Office

Re. 26,204
Reissued May 16, 1967

26,204
METHODS OF FORMING AND APPLYING MIXTURES

Bernard W. Young, Waco, Tex., assignor to Raymond T. Young, Waco, Tex.

Original No. 3,206,174, dated Sept. 14, 1965, Ser. No. 254,837, Jan. 29, 1963. Application for reissue Feb. 14, 1966, Ser. No. 532,514
22 Claims. (Cl. 259—149)

Matter enclosed in heavy brackets [ ] appears in the original patent but forms no part of this reissue specification; matter printed in italics indicates the additions made by reissue.

This application is a continuation-in-part of my co-pending application, Serial No. 81,441, filed January 9, 1961, for Methods of and Apparatus for Forming and Applying Mixtures, now Patent No. 3,128,997, dated April 14, 1964.

This invention relates to methods of forming and applying mixtures, more particularly slurry mixtures such as slurry seals comprising particulate solid material, emulsified asphalt and usually moisture, which may be water added to the solids.

As explained in the parent application, Serial No. 81,441 (Patent No. 3,128,997) emulsified asphalt slurry seals have been used primarily for surfacing or resurfacing and sealing vehicular transportation surfaces generally, for example streets and roads and air strips. Slurry seals of this class should have such a composition and should be so handled, that is, mixed and deposited upon the surface, as to have a high degree of impregnation so as to produce an effective surface seal, fill cracks and so on with little or minimum tendency to separate from the base surface.

Emulsified asphalt slurry seals have been used in the past with varying degrees of success when mixed in and deposited on the surface to be coated and sealed by mixing apparatus of conventional kinds, primarily ordinary ready mixed concrete trucks of well known design and mixing characteristics. Among the problems heretofore encountered has been that of effecting a satisfactory mixing without suffering the disadvantage of requiring more than desirable time for the slurry seal to set after being deposited on the surface, that is to be ready to accommodate vehicles. It has been known previously that the presence of certain materials, principally calcium oxide, in any of the mineral aggregates used in such slurries causes a chemical "break" when mixed with the emulsified asphalt, the break being accompanied or manifested by setting or the losing of flowable and spreadable characteristics of the mixture. In order to prevent the occurrence of a break in the mixture while still being mixed in a relatively slowly operating mixing apparatus, and so to insure that the mixture could be deposited onto the surface before the break or setting, it has been necessary or usual to include a relatively high water content in the mixture. It has followed that with high water contents, a slurry once deposited upon the surface has had to undergo a so called "evaporation break" of long duration before the sealed surface could accommodate traffic. Efforts to shorten the evaporation break time by reducing the water content have inevitably brought on complications in the premature occurrence of a chemical break in the mixer. The dilemma of liability of premature chemical break in the mixer on the one hand and undesirably long evaporation break on the other hand is apparent.

Application 81,441 (Patent No. 3,128,997), discloses a method and apparatus largely overcoming prior art obstacles to facile and economical use of slurry seals by mixing the ingredients in such a way as to take advantage of the benefits of a mixture inherently having a quick chemical break tendency without permitting the chemical break to take place until the mixture has been deposited upon the surface to be treated.

An object of the present invention is to provide still further improvements in the mixing and applying of slurry seals. In a broad sense, these improvements are obtained by employing, in the slurry mixture, a relatively small proportion of fine particulate mineral material in addition to the principal relatively coarser aggregate. Portland cement is one example of the fine particulate mineral material which may be used to obtain improved results. The added fine material acts as a filler and renders it possible, when desired, to use a coarser principle aggregate than would work satisfactorily in the absence of such a filler. Thus, a principal aggregate of the coarseness of washed concrete sand may be used together with the finer filler, with resultant increase in the ease of discharging the slurry from a mixer and greater accuracy of operation. The addition of the relatively fine particulate filler provides a carrier having such viscosity properties as to prevent stratification and settling out of the principal aggregate particles.

In co-pending application Serial No. 81,441 (Patent No. 3,128,997), there is a disclosure of how to use a slurry seal mixture inherently having quick chemical break characteristics, to mix the ingredients thoroughly and quickly enough to enable the mixture to be discharged onto the road or other surface before the break takes place and then to have the slurry set and become ready for use in a short time through a quick chemical break taking place in the material deposited on the surface. The present invention provides a method for obtaining still better results and also for widening the range of aggregate materials which may be used.

As stated above, the slurry seal mixture should be such as to impregnate the old surface to be treated to a maximum extent so as to provide an effective seal and to avoid separation or parting. The apportioning of the ingredients of a mixture having the desired impregnation properties is well within the skill of asphalt chemists and engineers. Generally stated, some solid material aggregates are not suitable for use as the sole solid material in slurry seal mixtures compounded and mixed in accordance with this invention, because they will not produce a chemical break when mixed with emulsified asphalt. One example of such a material is beach sand which does not produce a chemical break when mixed with asphalt emulsion, and therefore cannot be used as the only solid material in practicing the invention. However, beach sand and other materials known to have no chemical break inducing characteristics when mixed with emulsified asphalt may be used together with other materials which do have the required tendency for controlling the mixing characteristics and the wearing properties of the slurry seal mixture. The prime considerations in practicing the invention are firstly that the mixture itself, as to constituency, be inherently capable of producing a quick chemical break, and secondly, thorough mixing of the ingredients and discharging them from the mixing apparatus in a very short time so that the ensuing chemical break will take place after the slurry has been deposited upon the surface. The first requirement is determinable on the basis of constituent properties known to asphalt chemists and engineers, but heretofore they did not provide a method or apparatus by the use of which the advantages of the quick chemical break could be realized in practical applications of slurry seals. A typical example of a slurry seal mixture produced by continuously feeding materials to and discharging the mixture from a mixing apparatus follows:

Amount of emulsion per minute—16 gallons
Amount of aggregate per minute—800 lbs.
Amount of water per minute—2 to 16 gallons The ratio of emulsion to aggregate is, of course, variable, according to the desired mixing characteristics and final properties of the slurry seal. The amount of water is variable according to the desired thickness of the slurry which may depend upon the nature of the old surface to be treated or sealed. Furthermore, the amount of water may be varied according to any moisture content inherently present in the solid aggregate. In the foregoing example, the emulsified asphalt conformed to Texas specification E.A.-11-M (Asphalt Institute specification SS1). Emulsified asphalt conforming to Texas specification E.A.-10-S has also been used with good results.

In the above example, the aggregate was Rockdale slag, the aggregate conforming to the following specifications:

PHYSICAL ANALYSIS OF ROCKDALE SLAG AGGREGATE

Sieve analysis (wet):

| Sieve size— | Percent passing |
|---|---|
| #4 | 97 |
| #8 | 82 |
| #16 | 43 |
| #30 | 22 |
| #50 | 16 |
| #100 | 8.9 |
| #200 | 4.0 |
| #325 | 2.2 |
| Unit weight (dry loose) lbs./c.f. | 92 |
| Specific gravity | 2.81 |

The analysis of the Rockdale aggregate is indicated by the following analysis and properties of Rockdale fly ash:

TYPICAL CHEMICAL ANALYSIS

| | Percent |
|---|---|
| Silicon dioxide ($SiO_2$) | 38.6 |
| Calcium oxide (CaO) | 20.9 |
| Ferric oxide ($Fe_2O_3$) | 6.17 |
| Aluminum oxide ($Al_2O_3$) | 18.7 |
| Magnesium oxide (MgO) | 1.05 |
| Free lime (CaO), none detectible. | |
| Available alkalis ($Na_2O+K_2O$) | 1.06 |
| Loss on ignition | 6.00 |
| Moisture content | 0.79 |

TYPICAL PHYSICAL PROPERTIES

Specific surface area (Blaine) sq. cm./gm. 2115
Sieve analysis (wet):

| Sieve Size | Percent Passing | Percent Retained |
|---|---|---|
| #50 | 97 | 3 |
| #100 | 88 | 12 |
| #200 | 70 | 30 |
| #325 | 63 | 37 |

Unit weight (dry loose) lb./c.f. 76
Specific gravity 2.57

As previously stated, sand and other mineral fillers can be used if properly graded and if free of undesired chemical reaction tendencies toward the other ingredients of the mixture.

According to the present invention, Portland cement or other particulate mineral "fines" material of generally correspondingly small particle size may be used as the filler. The proportion of mineral fines filler to principal and relatively coarser aggregate will vary according to the properties and characteristics, e.g. particle sizes, of the principal aggregate and fines. Generally, the proportion of mineral fines filler to principal aggregate is in the range .5% to 5.0% by weight.

Typical exemplary material and mixing proportions are given below with references to standard designations as follows:

Federal Specifications: SS-A-674b—Asphalt Emulsion
American Society for Testing Materials, Serial Designation:
- C-136-46—Sieve Analysis of Fine and Coarse Aggregate
- C-33-59—Concrete Aggregates
- C125-58—Terms Relating to Concrete and Concrete Aggregates
- D242-57T—Mineral Filler The preferred emulsified asphalt conforms, for example, to the requirements of Federal Specification SS-A-674b. SS-2 with a penetration range of 40-100 and *viscosity* [viscosity] range of 20-50 is advisable.

The mineral aggregates may have varying constituencies, as illustrated below:

MINERAL AGGREGATE MIXTURE NO. 1

In this mixture, the aggregate comprises natural angular sand, manufactured sand or a combination of both, according to ATSM Designation C-33-59. The aggregate should be clean and free of deleterious substances. Aggregate subjected to five cycles of the soundless test should show a loss no greater than 10% when sodium sulfate is used. The aggregate should be graded within the following limits:

| Sieve size: | Percentage passing |
|---|---|
| ⅜ in. | 100 |
| No. 4 | 95-100 |
| No. 8 | 80-100 |
| No. 16 | 50-100 |
| No. 30 | 25-60 |
| No. 50 | 10-30 |
| No. 100 | 2-10 |

This aggregate is mixed with 1%-3% fines, comprising Portland cement or limestone dust or equivalent complying with ASTM D242-57T based on the fineness modulus of the *aggregate* sample, as set forth in the following table:

| Fineness moduli: | Percentage mineral filler |
|---|---|
| 2.15 | 1.0 |
| 2.30 | 1.25 |
| 2.45 | 1.50 |
| 2.60 | 1.75 |
| 2.75 | 2.0 |
| 2.90 | 2.25 |
| 3.05 | 2.50 |
| 3.20 | 2.75 |
| 3.25 | 3.0 |

MINERAL AGGREGATE MIXTURE NO. 2

In this mixture the aggregate components comprise commercially produced limestone fines, ceramic slag, or other approved materials, or a blend of such materials with clean sand. The combined mineral aggregate should have a percentage of wear loss not exceeding 35. The plasticity index should not exceed 5 and the sand equivalent should be 45 min. The combined aggregate conforms generally to the following grading, according to ASTM C-136-46 and C-117-59:

| Sieve Size | #1 Percent Passing | #2 Percent Passing |
|---|---|---|
| 3/8 inch | 100 | 95-100 |
| 1/4 inch | 100 | 80-95 |
| 10 mesh | 80-95 | 65-80 |
| 40 mesh | 35-60 | 35-60 |
| 80 mesh | 12-30 | 15-35 |
| 200 mesh | 3-12 | 5-15 |

Mineral aggregate mixture No. 1 preferably is used when the application rate is to be below 7 pounds P.S.Y. Mineral aggregate mixture No. 2 preferably is used when the application rate is above 7 pounds P.S.Y. When the aggregate comprises a blend of sand and other materials, the sand should not exceed 50% by weight of the total combined aggregate.

The percentage of asphalt emulsion to be used is based on the fineness modulus of the [sand] *aggregate* in the mix, according to the following table:

| Fineness moduli: | Emulsion percentages |
|---|---|
| 2.15 | 15 |
| 2.30 | 14 |
| 2.45 | 13.5 |
| 2.60 | 13.25 |
| 2.75 | 13 |
| 2.90 | 12.75 |
| 3.05 | 12.5 |
| 3.20 | 12.25 |
| 3.35 | 12 |

The so determined percentage of asphalt emulsion, based on dry aggregate weight, is blended with the prewet sand. Only an amount of water needed to obtain a fluid and homogeneous mixture should be added. Since the consistency desired for various surface conditions may vary slightly, some variations from the proportions indicated above may be resorted to, although no drastic departures from the indicated percentages should be used.

In one procedure, asphalt emulsion may be blended with an aggregate conforming generally to the mineral aggregate mixture No. 1 set forth above in the proportion of about 9% to 12% (residual asphalt content) by dry aggregate weight. In another procedure, the asphalt emulsion may be blended with the mineral aggregate mixture No. 2 outlined above in the proportion of about 8% to 11% (residual asphalt content) by dry aggregate weight. Again, only the amount of water necessary to obtain a fluid and homogeneous mixture should be added, and the amount of water may be varied slightly according to different surface conditions.

In general, the fines used in accordance with the invention should all pass a 200 mesh screen and about 98% should pass a 325 mesh screen, about 98% being minus 44 microns in size. The fines may be either chemically active, such as Portland cement and dehydrated lime, or surface active such as bentonite and asbestos. The chemically active fines material interacts chemically with the water and emulsifier, whereas the surface active fines material interacts with water and emulsifiers according to the van der Waals forces or adsorption theory.

The kind of fines material used should be determined with regard to the coarser particulate material included in the aggregate mixture. For example, when beach sand is included in the aggregate mixture, a higher percentage of fines may be required than when using crushed or more angular natural sand material. Beach sand is a weathered material that generally is rounded and therefore does not provide for the degree of normal wedging action that takes place when using crushed or natural sand material. Also, beach sand is usually somewhat more uniform in size than other sands so that from 50% to 100% more fines may be required when using beach sand than when using more angular types of sands. Thus, while the mineral aggregate mixture No. 1 discussed above is stated to have fines comprising from about 1% to 3% by weight, a range of fines up to 5% by weight may be used to advantage when the aggregate is beach sand or other material of generally similar size, shape and uniformity. Generally speaking, even for aggregates having very angular particles, the percentage of fines should not be lower than about 0.55%.

In the mixing of a slurry seal according to the foregoing examples, and other slurry seals having the desired quick chemical break tendencies, the principal aggregate and mineral fines filler are introduced into a mixing container and are fed through the container while being agitated and thereby mixed in such a way as to effect thorough and intimate mixing of the constituents in a very short period of time, which may be as short as of the order of 1½-2 minutes. The presence of the mineral fines filler in the mixture prevents stratification and settling out of the principal aggregate material, even when the latter is of such coarseness as washed concrete sand. It thus is possible to discharge the slurry seal mixture onto the surface to be treated before there has been any substantial chemical break within the mixing apparatus, or a mechanical break which would occur as a result of a long mixing operation, yet while the mixture is so nearly at the chemical breaking point that the chemical break will take place very soon after the material has been spread on the surface. All of this is accomplished with the use of much less moisture in the mix than heretofore was considered possible with the distinctly advantageous result that the slurry seal mixture, once applied to the surface does not have to go through a time consuming evaporation break before it is ready to bear traffic.

A preferred mixing procedure is that disclosed in application Serial No. 81,441 (Patent No. 3,128,997), as including the application of force to the mixture tending to move it through the mixing container continuously to the point of discharge from the container, and the application of other forces tending to move the mixture oppositely, one of the forces bucking the other of the forces, so to speak, and producing the required intimate mixture within a very short time.

One form of apparatus which has been used with marked success in practicing the invention in applying slurry seal is shown in the accompanying drawings, in which:

FIGURE 1 is a vertical longitudinal sectional view of apparatus embodying the invention, a slurry spreading apparatus being shown in elevation;

FIGURES 3a, 3b and 3c are views in vertical section, showing three positions of a discharge closure member or gate respectively when closed, when set for normal slurry discharging operation, and when set for emptying the mixing apparatus container;

FIGURE 4 is a transverse horizontal sectional view on line 4—4 of FIGURE 2, showing the mounting of the closure member or gate on the rear wall of the mixing container.

An illustrative and preferred form of a mixer M is shown in its most usual but not necessarily its only environment of use as being mounted upon a wheeled truck only a part of the frame of which is shown at T. Also mounted on the truck is a slurry spreader S disposed to spread and otherwise apply slurry discharged by the mixer to the surface to be coated or sealed. A belt conveyor C is mounted under a hopper H carried by the truck for receiving principal aggregate, that is relatively coarse particulate solid material, and delivering it into a horizontal mixer container MC, the aggregate falling off the conveyor into the front part of the mixer container shown at the left in FIGURE 1. A fines feeder apparatus, generally designated FF including a hopper 100 having a bottom discharge opening 101 is mounted at the rear of the hopper H and is so positioned as to discharge mineral filler particulate material into the front part of the mixer M at the zone of introduction of the principal aggregate material. A water inlet means, e.g. a fitting WI, preferably a spray head or nozzle, is arranged to discharge into the container MC adjacent to the point of delivery of aggregate and fines to the container, and an emulsion inlet means, e.g. a fitting EI, preferably also a spray head or nozzle, is arranged to deliver emulsified asphalt to the container MC at a point spaced from the water inlet WI in the direction of travel of material from the front to rear of the container, that is from left to right as viewed in FIGURE 1. A discharge gate generally designated G, is provided in the rear of the container for delivering mixed slurry to the roadway or other surface to be spread and finished off by the spreader S. The latter may be of the sled type equipped with a distributing belt and squeegee of generally known construction.

Figure 5:
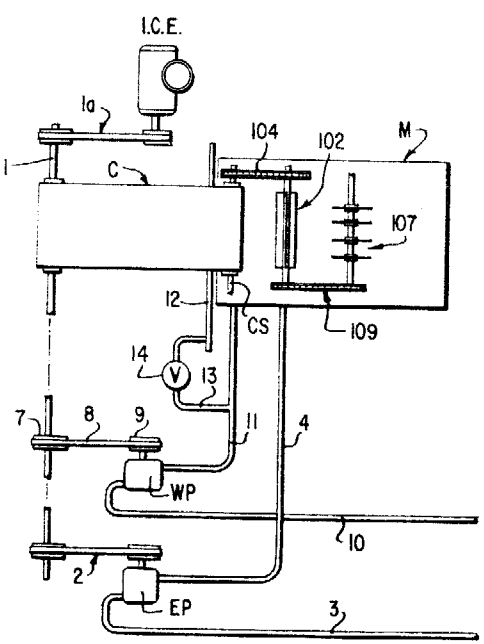
FIGURE 5 is a schematic view or flow diagram showing the relation of the aggregate conveyor, the fines feeder and the emulsion and water supplies to the mixer.

Predeterminedly proportioned amounts of aggregate, fines, water and emulsified asphalt are delivered to the front part of the mixer container MC. The proportions may be varied according to conditions, such as weather and the specific type of surfacing required. However, for any particular sealing application, the proportions, once determined, should be maintained constant or substantially so. FIGURES 1 and 5 show an arrangement by means of which the proportions, once determined, and the mechanism adjusted accordingly, will maintain the proportions constant for all practical purposes. As shown in FIGURE 5, an internal combustion engine ICE serves as a common source of power or driver for the aggregate conveyor C, the fines feeder FF, an emulsion pump EP and a water pump WP. Drive from the internal combustion engine ICE is transmitted to a shaft 1 through a chain and sprocket drive 1a. Mounted within the fines feeder discharge opening 101 is a rotary metering valve 102 in the form of a vaned paddle wheel rotation of which delivers measured quantities of fines to the mixer M. So that the fines may be delivered in predetermined proportion to the principal aggregate delivery, the valve 102 is driven at a rotary speed having a predetermined relation to the speed of the conveyor C. In the form shown, the valve 102 is driven from a rear conveyor roll shaft CS through a small sprocket 103 on the shaft CS, a chain 104, and a large sprocket 105 on the shaft 106 of the valve 102. The drive ratio from the shaft CS to the shaft 106 may be varied in any suitable way for providing a desired proportion of fines to principal aggregate feed. For example, interchangeable sprockets of different diameters may be used, or alternatively, a variable speed beltdrive. An agitator 107 having fingers 108 is mounted for rotation in the fines hopper 100 above the valve 102 for preventing the fines material from bridging and failing to descend to the valve 102. The agitator 107 may be driven from the valve shaft 106 by a sprocket and chain mechanism 109.

The shaft 1 also transmits drive to the emulsion pump EP by a chain and sprocket drive 2. The pump EP receives its supply of emulsified asphalt through a pipeline 3 and delivers the emulsion to the emulsion inlet spray head EI by way of a pipe 4. Thus, for any predetermined opening of a hopper gate 5 controlling the rate of feed of aggregate to the conveyor C, and speed of rotation of the metering valve 102, the proportions of emulsion, aggregate and fines delivered to the mixer container MC will remain constant by virtue of the fixed drive ratio of the conveyor and the pump EP. Preferably, the engine ICE is governed to operate at a constant speed, or substantially so. When it is desired to vary the proportions of aggregate and emulsion, the hopper gate 5 may be adjusted so as to increase or decrease the rate of feeding of aggregate to the mixer container, the rate of delivering emulsion, however, remaining unchanged. The rate of delivering fines may be varied as explained above.

As previously indicated, the amount of any water added to the mixture will depend upon practical considerations, including importantly the degree of dampness of the aggregate itself, weather conditions and the viscosity of the slurry desired, according to the nature and condition of the surface to be treated. The water pump WP is driven from the shaft 1 through a pulley 7, V belt 8 and variable diameter pulley 9 on the water pump shaft. By adjusting the effective diameter of the pulley 9, required variations in the rate of delivering water to the mixer container may be obtained. As shown in FIGURE 5, water is supplied through a pipe 10 to the pump WP and is discharged by the pump through a pipe 11 into the mixer container.

In many cases, it may be advisable to wet the roadway or other surface with water in advance of depositing the slurry seal mixture on the surface. For this purpose, a spray bar 12 is mounted on the truck équipment, for example at the front of the mixer container MC as shown in FIGURE 1, and is arranged to be supplied with water through a branch pipe 13 extending from the pipe 11 and being controlled by a valve 14.

In the operation of the mixing apparatus, considered generally, aggregate and fines are simultaneously introduced into a material receiving station RS at the front or left end of the container MC, as is water, either in the aggregate or through the spray head WI, and the solids and water are then given a preliminary agitation and mixing in the front portion of the container MC by a mixer structure generally designated MS. The mixed solids and water are fed toward a discharging station DS at the rear of the container MC, emulsified asphalt being introduced through the spray head EI at a point which, in the form shown, is approximately one third of the length of the container MC from front to rear, or left to right as viewed in FIGURE 1. The slurry, thoroughly mixed, is discharged at the rear through the gate G. Importantly, the emulsified asphalt does not come into contact with the solids unless or until the latter have been thoroughly moistened, as by water introduced at the spray head WI and mixed with the solids before the latter have moved rearwardly to the emulsion inlet EI. During the travel of the ingredients and the mixture of ingredients toward the gate G, they are subjected to different forces, some tending to feed the material rearwardly as well as to agitate it, and others tending to feed the material forwardly, the bucking of the forces creating an intense and thorough agitation which produces a completely mixed slurry seal within such a short time that the finished mixture may be delivered from the gate G before any break has taken place within the mixer.

Figure 2:
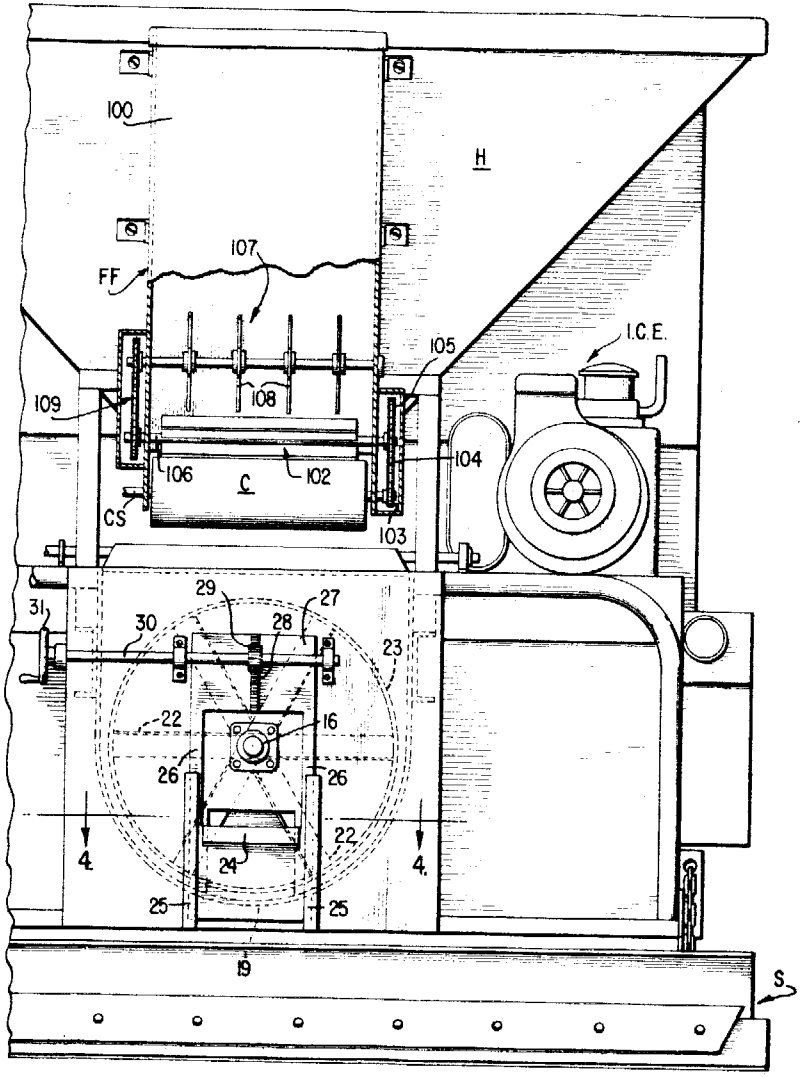
FIGURE 2 is a rear elevational view of the discharge end of the apparatus.

The advantages of this method of mixing may be obtained by using an unique construction of the mixer M, and particularly the mixer structure or means MS. In the illustrated embodiment, the mixer structure MS comprises a horizontal central shaft 15 mounted to rotate in bearings 16, 16 carried respectively by the front and rear end walls 17 and 18 of the container MC. The container MC has a substantially semicylindrical bottom portion 19 which merges with vertically extending sides as shown in FIGURE 2. The axis of the shaft 15 extends from the receiving station RS to the discharging station DS, and is approximately at the top of the semicylindrical bottom portion 19.

The mixer structure MS is preferably driven from the shaft 1 through an universal coupling 20 connected to the shaft 15, the shaft being rotated clockwise as viewed from the rear of the container MC, that is when viewed when looking in the direction of the arrow A in FIGURE 1.

The structure MS includes means, as shown a plurality of blades or paddles 21 and 22, mounted on and projecting radially from the shaft 15 and being deployed helically along the shaft axis. The outer ends of the blades or paddles serve to mount a ribbon like helical means which, in the illustrative structure, is a member 23 which follows the helical deployment of the blades or paddles. The helix 23 is of a radius such as to enable the helix to operate close to the bottom 19 of the mixer container with, of course, reasonable and safe operating clearance. When the helix is rotated clockwise as viewed from the rear, it will act continuously from end to end with a tendency to force material toward the gate G in the container rear wall.

As stated above, the material is subjected to the actions of opposing forces within the container for effecting intimate mixing within a short period of time. To this end, the first set of blades 21, which extend from the front wall 17 of the container through a first zone terminating at the line Z—Z in FIGURE 1, are inclined about their own radial axes with respect to their planes of rotation, the inclination of the blades 21 being such that their rotation tends to force material in the receiving station RS toward the right, that is toward the discharge gate G, in concert with the action of the helix 23. The direction of forcing of material by the first set of blades 21 is indicated by arrows a applied to these blades in FIGURE 1. The water introduced in the receiving station RS through the inlet WI is relatively very readily mixable with the aggregate and fines, so that although the blades 21 and helix 23 both act in the same direction in the receiving station, the aggregate will be thoroughly and evenly moistened by the time it has moved rearwardly to the zone Z—Z.

The blades of the second set of blades 22 are, however, inclined oppositely to the blades 21. Consequently, these blades which are in a second zone extending from the line Z—Z to the rear wall 18, tend to force material forwardly, as indicated by the arrows b, in opposition to the forcing of material by the helix 23 and blades 21 acting in concert. The result of the oppositely acting forces is to prevent straight-through flow of the mixture from front to rear, and to cause the mixture to be circulated in various directions as indicated by the curved arrows in FIGURE 1, and to be humped up within the container, so to speak, as shown by the stippling. By preventing straight-through flow of material, stratification and poor mixing are avoided, and very importantly, the time required for producing a satisfactory mixture is greatly reduced. Since the emulsion is introduced at the spray head EI to the rear of the zone Z—Z, it will come into contact with the aggregate and fines mixture only after the latter has been thoroughly moistened, and premature breaking of the emulsion will be prevented.

Still further improvements are effected by discharging the slurry mixture from the container MC at a level approximately that of the top of the material in the container, and well above the container bottom 19. High level discharging of the mixture avoids initial and continued or sporadic draining of an "off" mixture too high in liquid, especially when the container is tilted with its discharge end lowered, as when the equipment is ascending a hill.

In the illustrated construction, high level mixture discharge is achieved by provision of an opening 18 a in the container rear wall 18, and a closure member or movable gate component 24 so mounted on the container as to be moved downwardly to the position shown in FIGURES 1 and 3b to enable the mixture to be discharged over the top of the closure member 24 at a level well above that of the container bottom and below the top of the opening 18a. The closure member is of plate-like form, and is mounted to slide vertically in guide tracks 25 secured to the container rear wall 18. The member 24 is provided with upwardly extending arms 26 bridged by a plate 27 which is equipped with a rack 28 meshing with a pinion 29 on a shaft 30 equipped with a hand wheel 31. Operation of the wheel 31 and its associated driving elements will raise or lower the gate member 24 as required. FIGURE 3a shows the gate in closed position, completely covering the opening 23. FIGURES 1 and 3b show the gate in a normal operating position for discharging mixed slurry over the top of the gate at a high level with reference to the container bottom. The rate of discharge of the material may be varied according to requirements by adjusting the gate means to define selected different degrees of effective opening above the gate 24. The gate may be raised to the relatively extreme position shown in FIGURE 3c to enable the mixer container MC to be cleaned out by a stream of flushing water, in this case the opening 23 being uncovered at or immediately above the container bottom to provide a container emptying opening.

The foregoing description of the method of producing slurry seal mixtures and apparatus for use in practicing the method is believed to be so full and complete as to enable those skilled in the art to practice the invention. It may, however, be noted with more particularity that the mixing apparatus illustrated and described, and which has been used with marked success, is four feet long, the helix diameter is twenty-eight inches, the blades 21—22 are spaced from each other at 60° around the shaft, the helix pitch is eleven and one half inches, and the preferred operating speed of the mixer structure MS is 60–80 r.p.m. It is, of course, apparent that changes may be made in particular dimensions, proportions and speeds and otherwise according to the materials used, the weather and the condition of the surface to be sealed. Use of the opposing forces and the top discharge is preferred to be maintained in any modified method or structure.

The procedure and structure described and shown are representative of the invention, but it is intended that the disclosure be illustrative rather than definitive, the invention being defined in the claims.

I claim:

1. In a method of forming a slurry mixture, introducing relatively coarse particulate solid aggregate material into a mixing container; simultaneously introducing relatively fine particulate material [having a particle size substantially in the fineness moduli range 2.15–3.25] into said container substantially at the zone of introduction of said aggregate material; feeding said aggregate material along a path extending through the container while agitating and mixing said materials; introducing moisture into said container and said materials therein as the materials progress along a first portion of the path through the container; introducing emulsified asphalt into said materials in the remaining portion of said path at a zone adjacent said first portion of said path; agitating and mixing said materials, said moisture and said asphalt throughout the remaining portion of said path; maintaining said materials, said moisture and said emulsified asphalt in said container throughout their feeding along said path; and discharging the slurry mixture containing all of the introduced materials, moisture and emulsified asphalt at the end of said path.

2. A method according to claim 1 in which said aggregate material has a particle size substantially in the range [No. 4] ⅜ *in.*–No. 325 sieve size, and said relatively fine particulate material has a particle size of the order of that of Portland cement.

3. A method according to claim 1 in which the amount of said relatively fine particulate material is in the range of .5%–5.0% of the aggregate material, by weight.

4. A method according to claim 2 in which the amount of said relatively fine particulate material is in the range of .5%–5.0% of the aggregate material, by weight.

5. In a method of forming a slurry mixture, introducing relatively coarse particulate solid aggregate material into a mixing container; simultaneously introducing relatively fine particulate material [having a particle size substantially in the fineness moduli range 3.15–3.25] into said container substantially at the zone of introduction of said aggregate material; feeding said aggregate material and said relatively fine particulate material along a path extending through the container while agitating and mixing said materials; introducing moisture into said container and said materials therein as the materials progress along substantialy the first one-third of the path through the container; introducing emulsified asphalt into said materials in the part of the remaining two-thirds of said path adjacent said first one-third of said path; agitating and mixing said materials, said moisture and said asphalt throughout the remaining portion of said path; maintaining said materials, said moisture and said emulsified asphalt in said container throughout their feeding along said path; and discharging the slurry mixture containing all of the introduced materials, moisture and emulsified asphalt at the end of said path.

6. A method according to claim 5 in which said aggregate material has a particle size substantially in the range [No. 4] ⅜ *in.*–No. 325 sieve size, and said relatively fine particulate material has a particle size of the order of that of Portland cement.

7. A method according to claim 5 in which the amount of said relatively fine particulate material is in the range of .5%–5.0% of the aggregate material, by weight.

8. A method according to claim 6 in which the amount of said relatively fine particulate material is in the range of .5%–5.0% of the aggregate material, by weight.

9. In a method of forming and applying a slurry seal to a roadway or like surface, introducing relatively coarse particulate solid aggregate material into a mixing container; simultaneously introducing [relative] *relatively* fine particulate material [having a particle size substantially in the fineness moduli range 2.15–3.25] into said container; introducing moisture and emulsified asphalt into said container; and rapidly mixing said materials with the moisture and emulsified asphalt and applying the final slurry seal mixture of said materials, moisture and asphalt to said surface with said slurry seal mixture still containing all of said materials, said moisture and said emulsified asphalt, said materials and said asphalt having such mutually related characteristics when mixed together as to produce a quick chemical break, and the time of mixing said materials and moisture with said asphalt being less than the period for manifestation of the chemical break, the latter occurring after application of the final mixture to the surface.

10. A method according to claim 9 in which said aggregate material has a particle size substantially in the range [No. 4] ⅜ *in.*–No. 325 sieve size, and said relatively fine particulate material has a particle size of the order of that of Portland cement.

11. A method according to claim 9 in which the amount of said relatively fine particulate material is in the range of .5%–5.0% of the aggregate material, by weight.

12. A method according to claim 10 in which the amount of said relatively fine particulate material is in the range of .5%–5.0% of the aggregate material, by weight.

13. In a method of forming a slurry mixture, introducing relatively coarse particulate solid aggregate material into a mixing container; simultaneously separately introducing relatively fine particulate solid material into the container; applying a first force throughout the container tending to move said materials through the container for discharging said materials therefrom; applying a supplemental force to said materials throughout a first container zone extending from the place of introducing of said materials toward the place of discharge but terminating short of the latter, said supplemental force also tending to move said materials through the container for discharging said materials therefrom; applying an opposing force to said materials throughout a second container zone extending from said first container zone to the place of discharge and tending to move said materials oppositely in said container; and introducing emulsified asphalt into said container in said second container zone.

14. In a method of forming a slurry mixture, introducing relatively coarse particulate solid aggregate material into a mixing container; simultaneously separately introducing relatively fine particulate solid material into the container; applying a first force throughout the container tending to move said materials through the container for discharging said materials therefrom; applying a supplemental force to said materials throughout a first container zone extending from the place of introducing of said materials toward the place of discharging but terminating short of the latter, said supplemental force also tending to move said materials through the container for discharging said materials therefrom; adding moisture to said materials in said first container zone; applying an opposing force to said materials throughout a second container zone extending from said first container zone to the place of discharge and tending to move said materials oppositely in said container; and introducing emulsified asphalt into said container in said second container zone.

15. In a method of forming and applying a slurry seal to a roadway or like surface, first providing in a mixer container a substantially uniformly moistened aggregate of particulate solid mineral material including relatively coarse particulate material, and relatively fine particulate material [, the latter having a particle size substantially in the fineness moduli range 2.15–3.25]; and then rapidly mixing said moistened aggregate with emulsified asphalt and applying the mixture to said surface while containing all of said relatively coarse particulate material, said relatively fine particulate material, the moisture and said emulsified asphalt, the aggregate and emulsified asphalt having such mutually related characteristics when mixed together as to produce a quick chemical break, and the mixing time being less than the period for manifestation of the chemical break, the latter occurring after application of the mixture to the surface.

16. In a method of forming and applying a slurry seal to a roadway or like surface, first providing in a mixer container a substantially uniformly moistened aggregate of particulate solid mineral material including relatively coarse material having a calcium oxide content and relatively fine material [, the latter having a particle size substantially in the fineness moduli range 2.15–3.25]; and then rapidly mixing said moistened aggregate with emulsified asphalt and applying the mixture to said surface while containing all of said relatively coarse particulate material, said relatively fine particulate material, the moisture and said emulsified asphalt, the aggregate and emulsified asphalt having such mutually related characteristics when mixed together as to produce a quick chemical break, and the mixing time being less than the period for manifestation of the chemical break, the latter occurring after application of the mixture to the surface.

17. In a method of forming a slurry mixture, introducing particulate solid material aggregate into a mixing container; applying a first force throughout the container tending to move the aggregate through the container for discharging the aggregate therefrom; applying a supplemental force to the aggregate throughout a first container zone extending from the place of introducing of the aggregate toward the place of discharge but terminating short of the latter, said supplemental force also tending to move the aggregate through the container for discharging the aggregate therefrom; applying an opposing force to the aggregate throughout a second container zone extending from said first container zone to the place of discharge and tending to move the aggregate oppositely in said container; and introducing emulsified asphalt into said container in said second container zone for being mixed with said aggregate only after the aggregate has first been mixed in said first container zone.

18. In a method of forming a slurry mixture, introducing particulate solid material aggregate into a mixing container; applying a first force throughout the container tending to move the aggregate through the container for discharging the aggregate therefrom; applying a supplemental force to the aggregate throughout a first container zone extending from the place of introducing of the aggregate toward the place of discharge but terminating short of the latter, said supplemental force also tending to move the aggregate through the container for discharging the aggregate therefrom; applying an opposing force to the aggregate throughout a second container zone extending from said first container zone to the place of discharge and tending to move the aggregate oppositely in said container; introducing moisture into said aggregate and mixing said aggregate and moisture in said first zone; and introducing emulsified asphalt into said container in said second container zone for being mixed with said aggregate only after the aggregate has first been mixed with moisture in said first container zone.

19. In a method of forming a slurry mixture, introducing particulate solid material aggregate into a mixing container; applying a first force throughout the container tending to move the aggregate through the container for discharging the aggregate therefrom; applying a supplemental force to the aggregate throughout a first container zone extending from the place of introducing of the aggregate toward the place of discharge but terminating short of the latter, said supplemental force also tending to move the aggregate through the container for discharging the aggregate therefrom; applying an opposing force to the aggregate throughout a second container zone extending from said first container zone to the place of discharge and tending to move the aggregate oppositely in said container; introducing emulsified asphalt into said container in said second container zone; and discharging the mixture from the container at a level approximately the same as the upper level of the mixture in the container at the point of discharge therefrom.

20. In a method of forming a slurry mixture, introducing particulate solid material aggregate into a mixing container; applying a first force throughout the container tending to move the aggregate through the container for discharging the aggregate therefrom; applying a supplemental force to the aggregate throughout a first container zone extending from the place of introducing of the aggregate toward the place of discharge but terminating short of the latter, said supplemental force also tending to move the aggregate through the container for discharging the aggregate therefrom; applying an opposing force to the aggregate throughout a second container zone extending from said first container zone to the place of discharge and tending to move the aggregate oppositely in said container; introducing moisture into said aggregate in said first container zone; introducing emulsified asphalt into said container in said second container zone; and discharging the mixture from the container at a level approximately the same as the upper level of the mixture in the container at the point of discharge therefrom.

21. In a method of forming a slurry mixture, introducing particulate solid material aggregate into a mixing container; applying a first force throughout the container tending to move the aggregate through the container for discharging the aggregate therefrom; applying a supplemental force to the aggregate throughout a first container zone extending from the place of introducing of the aggregate toward the place of discharge but terminating short of the latter and being approximately one-third as long as the path of material flow through said container, said supplemental force also tending to move the aggregate through the container for discharging the aggregate therefrom; applying an opposing force to the aggregate throughout a second container zone extending from said first container zone to the place of discharge and tending to move the aggregate oppositely in said container; introducing moisture into said aggregate in said first container zone; introducing emulsified asphalt into said container in said second container zone; and discharging the mixture from the container at a level well above the bottom of said container.

22. In a method of forming a slurry mixture, introducing [particular] *particulate* solid material aggregate into a substantially horizontal mixing container; applying force to said aggregate adjacent the bottom of the container in one direction toward the place of discharge from said container substantially continuously from end-to-end thereof; applying force to the aggregate above the container bottom at the region of introduction of the aggregate in the same direction throughout only a first part of the path of travel of the aggregate through the container; applying force to the aggregate in the opposite direction above the container bottom throughout the remaining part of the path of travel of the aggregate through the container; introducing water to said aggregate as it travels through said first part of said path; and introducing emulsified asphalt to the aggregate and water mixture in said remaining part of said path whereby the emulsified asphalt is mixed with the water and the aggregate only in said remaining part of said path and only after the water and aggregate have been mixed in said first part of said path.

References Cited by the Examiner

The following references, cited by the Examiner, are of record in the patented file of this patent or the original patent.

UNITED STATES PATENTS

| | | | |
|---|---|---|---|
| 1,370,764 | 3/1921 | Popkess | 259—178 X |
| 2,028,745 | 1/1936 | Hendrick et al. | 259—157 X |
| 2,917,395 | 12/1959 | Csanyi | 106—283 |

FOREIGN PATENTS

| | | |
|---|---|---|
| 125,833 | 10/1947 | Australia. |
| 880,481 | 11/1961 | Great Britain. |

WILLIAM I. PRICE, *Primary Examiner.*